US010200338B2

(12) United States Patent
Eidelson et al.

(10) Patent No.: US 10,200,338 B2
(45) Date of Patent: *Feb. 5, 2019

(54) INTEGRATING COMMUNICATION MODES IN PERSISTENT CONVERSATIONS

(71) Applicant: Google Inc., Mountain View, CA (US)

(72) Inventors: Benjamin David Eidelson, Palo Alto, CA (US); Heradon Douglas, Los Gatos, CA (US); Peter Pawlowski, Menlo Park, CA (US); Per Gustafsson, Stockholm (SE); Björn Kempén, Stockholm (SE); Jonas Erik Lindberg, Stockholm (SE)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/615,677

(22) Filed: Jun. 6, 2017

(65) Prior Publication Data

US 2017/0279761 A1 Sep. 28, 2017

Related U.S. Application Data

(63) Continuation of application No. 15/050,180, filed on Feb. 22, 2016, now Pat. No. 9,705,842, which is a
(Continued)

(51) Int. Cl.
*H04L 29/08* (2006.01)
*H04L 12/58* (2006.01)
(Continued)

(52) U.S. Cl.
CPC .............. *H04L 51/36* (2013.01); *H04L 51/16* (2013.01); *H04L 51/32* (2013.01); *H04L 65/403* (2013.01);
(Continued)

(58) Field of Classification Search
CPC ................................................ H04L 29/06027
See application file for complete search history.

(56) References Cited

U.S. PATENT DOCUMENTS 7,124,167 B1 10/2006 Bellotti
7,293,049 B2 11/2007 Kadyk et al.
(Continued)

FOREIGN PATENT DOCUMENTS

WO 2014/013356 1/2014

OTHER PUBLICATIONS

USPTO. Pre-Interview First Office Action received in U.S. Appl. No. 13/748,581, dated Dec. 8, 2014.
(Continued)

*Primary Examiner* — Adnan M Mirza
(74) *Attorney, Agent, or Firm* — IP Spring (57) ABSTRACT

Systems, methods and computer readable media for persistent conversations are described. In some implementations, a method can include receiving a communication message sent from a first user to at least one other user and generating a persistent conversation object having a conversation content section and conversation state information. The method can also include storing the communication message in the conversation content section of the persistent conversation object and forwarding the communication message to the at least one other user. The method can further include updating the conversation state information to reflect the receiving, storing and forwarding of the communication message.

20 Claims, 9 Drawing Sheets

Related U.S. Application Data continuation of application No. 13/748,579, filed on Jan. 23, 2013, now Pat. No. 9,270,630.

(51) Int. Cl.
  *H04W 4/14* (2009.01)
  *H04L 29/06* (2006.01)

(52) U.S. Cl.
  CPC ......... *H04W 4/14* (2013.01); *H04L 29/06027* (2013.01)

(56) References Cited

U.S. PATENT DOCUMENTS

| | | | |
|---|---|---|---|
| 7,441,199 B2 | 10/2008 | Zenith | |
| 7,512,400 B2 | 3/2009 | Starbuck et al. | |
| 7,603,467 B2 | 10/2009 | Malik et al. | |
| 7,743,022 B2 | 6/2010 | Kaasten et al. | |
| 7,769,144 B2 | 8/2010 | Yao et al. | |
| 8,001,102 B2 | 8/2011 | Szeto et al. | |
| 8,160,563 B2 | 4/2012 | Chen et al. | |
| 8,321,581 B2 | 11/2012 | Katis et al. | |
| 8,355,698 B2 | 1/2013 | Teng | |
| 8,411,046 B2 | 4/2013 | Kruzeniski | |
| 8,412,845 B2 | 4/2013 | Katis et al. | |
| 8,605,718 B2 * | 12/2013 | Hemar | G06Q 30/02 370/259 |
| 9,253,223 B1 | 2/2016 | Cushing et al. | |
| 9,270,630 B1 | 2/2016 | Eidelson et al. | |
| 9,338,403 B2 | 5/2016 | Eidelson et al. | |
| 9,705,842 B2 | 7/2017 | Eidelson et al. | |
| 2004/0015548 A1 | 1/2004 | Lee | |
| 2004/0223599 A1 | 11/2004 | Bear et al. | |
| 2005/0080848 A1 | 4/2005 | Shah | |
| 2007/0006094 A1 | 1/2007 | Canfield et al. | |
| 2007/0033534 A1 | 2/2007 | Kim et al. | |
| 2008/0313297 A1 | 12/2008 | Heron et al. | |
| 2010/0199340 A1 | 8/2010 | Jonas et al. | |
| 2011/0148916 A1 | 6/2011 | Blattner | |
| 2011/0216071 A1 | 9/2011 | Klassen et al. | |
| 2011/0222515 A1 | 9/2011 | Wang et al. | |
| 2011/0296324 A1 | 12/2011 | Goossens | |
| 2011/0320536 A1 | 12/2011 | Lobb et al. | |
| 2012/0004956 A1 | 1/2012 | Huston et al. | |
| 2012/0016941 A1 | 1/2012 | Douckine et al. | |
| 2012/0278475 A1 | 11/2012 | Papkipos et al. | |
| 2013/0117392 A1 | 5/2013 | Aceves | |
| 2013/0325922 A1 | 12/2013 | Chaudhri et al. | |

OTHER PUBLICATIONS

International Search Report and Written Opinion received in related PCT Application No. PCT/US14/12581, dated Jun. 23, 2014.
USPTO. First Action Interview Office Action received in U.S. Appl. No. 13/748,581, dated Nov. 2, 2015.
"USPTO", Final Rejection in U.S. Appl. No. 13/748,581, dated Mar. 31, 2016, 24 pp.
"USPTO, Non-final Office Action received in U.S. Appl. No. 13/748,581", dated Jul. 25, 2016, 14 pages.
USPTO, "Non-Final Office Action in U.S. Appl. No. 15/145,353", dated Aug. 27, 2018, 11 Pages.

* cited by examiner

INTEGRATING COMMUNICATION MODES IN PERSISTENT CONVERSATIONS

CROSS-REFERENCE TO RELATED APPLICATIONS

This application is a continuation of U.S. application Ser. No. 15/050,180 filed Feb. 22, 2016, which is a continuation of U.S. application Ser. No. 13/748,579 filed Jan. 23, 2013, now U.S. Pat. No. 9,270,630 Issued Feb. 23, 2016, the disclosure of which is expressly incorporated herein by reference in its entirety.

BACKGROUND

Computer and mobile device users may be increasingly communicating with each other using numerous different devices ranging from a desktop computer to a smartphone and/or tablet device, and users may often interact with more than one device type during a given day. Users may also be communicating using a variety of channels and protocols such as text messaging, instant messaging, email, social network messages, chat, one-to-one and/or multi-way audio and/or video conferences (audio/video conferences), and the like. Communications sent and received at one device in a given communication mode may not be reflected in user interfaces on other devices associated with the same user or in user interfaces for different communication modes.

SUMMARY

Some implementations relate generally to electronic communication, and, more particularly, to integrating electronic communication modes in persistent conversations.

Some implementations can include a method comprising receiving a first communication message in a first protocol. The first protocol can include a native persistent conversation client protocol. The method can also include receiving a second communication message in a second protocol. The second protocol can be different from the first protocol and can include an extensible messaging and presence protocol (XMPP).

The method can also include adding the first communication message and the second communication message to a conversation content section of a persistent conversation object, and providing, for display to a user, a user interface showing the conversation content including the first communication message and the second communication message.

Some implementations can include a method comprising receiving a first communication message in a first protocol and receiving a second communication message in a second protocol, wherein the second protocol is different from the first protocol. The method can also include adding the first communication message and the second communication message to a persistent conversation object.

The method can further include providing, for display to a user, a user interface showing persistent conversation content including the first communication message and the second communication message. The first protocol can include a native persistent conversation client protocol and the second protocol can include an extensible messaging and presence protocol.

The method can also include receiving a third communication message in a third communication protocol. The third communication protocol can be different from both the first communication protocol and the second communication protocol. The method can further include adding the third communication message to the conversation content of the persistent communication object, and updating the user interface to include the third communication message. The third communication protocol can include a short message service (SMS) protocol.

The method can also include receiving a fourth communication message in a fourth communication protocol, wherein the fourth communication protocol is different from each of the first communication protocol, the second communication protocol and third communication protocol. The method can further include adding the fourth communication message to the conversation content of the persistent communication object, and updating the user interface to include the fourth communication message. The fourth communication message can include a social network message.

Receiving the second communication message can include receiving the second communication message via a session server (e.g., a system that maintains connections to client devices). Receiving the third communication message can include receiving the third communication message via a short message service gateway (e.g., a system that sends and receives SMS messages over carrier networks).

Some implementations can include a system comprising one or more computers configured to perform operations. The operations can include receiving a first communication message in a first protocol and receiving a second communication message in a second protocol, wherein the second protocol is different from the first protocol. The operations also include adding the first communication message and the second communication message to a persistent conversation object, and providing, for display to a user, a user interface showing persistent conversation content including the first communication message and the second communication message. In some implementations, the first protocol can include a native persistent conversation client protocol and the second protocol can include an extensible messaging and presence protocol.

The operations can also include receiving a third communication message in a third communication protocol, wherein the third communication protocol is different from both the first communication protocol and the second communication protocol. The operations can further include adding the third communication message to the conversation content of the persistent communication object. The operations can include updating the user interface to include the third communication message. The third communication protocol can include an SMS protocol.

In some implementations, the operations can also include receiving a fourth communication message in a fourth communication protocol, wherein the fourth communication protocol is different from each of the first communication protocol, the second communication protocol and third communication protocol. The method can further include adding the fourth communication message to the conversation content of the persistent communication object, and updating the user interface to include the fourth communication message. The fourth communication message can include a social network message.

In some implementations, receiving the second communication message can include receiving the second communication message via a session server. Also, in some implementations, receiving the third communication message can include receiving the third communication message via a short message service gateway.

These and other features may provide one or more of the following advantages. By integrating communications messages into a persistent conversation object, the communication messages can be exchanged between devices over different protocols and viewed as a single persistent conversation. Automatically adapting a conversation to different devices though communication mode integration can provide a seamless upgrade experience for a user. By integrating communications modes into a single conversation, each user can participate in one conversation using one or more devices with each device potentially having a different communication mode.

DETAILED DESCRIPTION

In general, some implementations can include a method for integrating communication modes in a persistent conversation. The communication modes can include a native persistent conversation client protocol, extensible messaging and presence protocol (XMPP), short message service (SMS) protocol and/or other protocols such as those used by social network services. Persistent conversations can be stored in a central conversation storage object having conversation content and conversation state information. Some implementations can include providing an up-to-date view of the conversation with integrated communication modes that can be displayed on multiple diverse devices such as a computer, smartphone and tablet device.

Some implementations of the method include receiving a first communication message in a first protocol and receiving a second communication message in a second protocol. For example, the first protocol can be a native persistent conversation client protocol and the second protocol can be an XMPP.

The method can include adding the first communication message and the second communication message to the conversation content of persistent conversation object. The method can further include providing, for display to a user, a user interface showing conversation content including the first communication message and the second communication message. Sending the communication messages to the various devices may take place in the protocol corresponding to the client application of each device associated with a user participating in the conversation.

Some implementations can include receiving a third communication message in a third communication protocol, for example a short message service protocol. The method can include adding the third communication message to the conversation content of the persistent communication object. The method can include updating the user interface to include the third communication message.

Some implementations can include receiving a fourth communication message in a fourth communication protocol, for example receiving a message from a social network service in a social network service protocol. The method can include adding the fourth communication message to the conversation content of the persistent communication object. The method can also include updating the user interface to include the fourth communication message.

The second communication message (e.g., XMPP message) can be received via a session server. The third communication message (e.g., SMS message) can be received via an SMS gateway.

While some implementations are discussed herein in relation to certain example message types such as text messaging (e.g., short message service), email, chat, social network messages, one-to-one and/or multi-way audio/video conferences, phone calls and phone call logs, it will be appreciated that persistent conversations can be applied to other know or later developed message or communication types.

Figure 1:
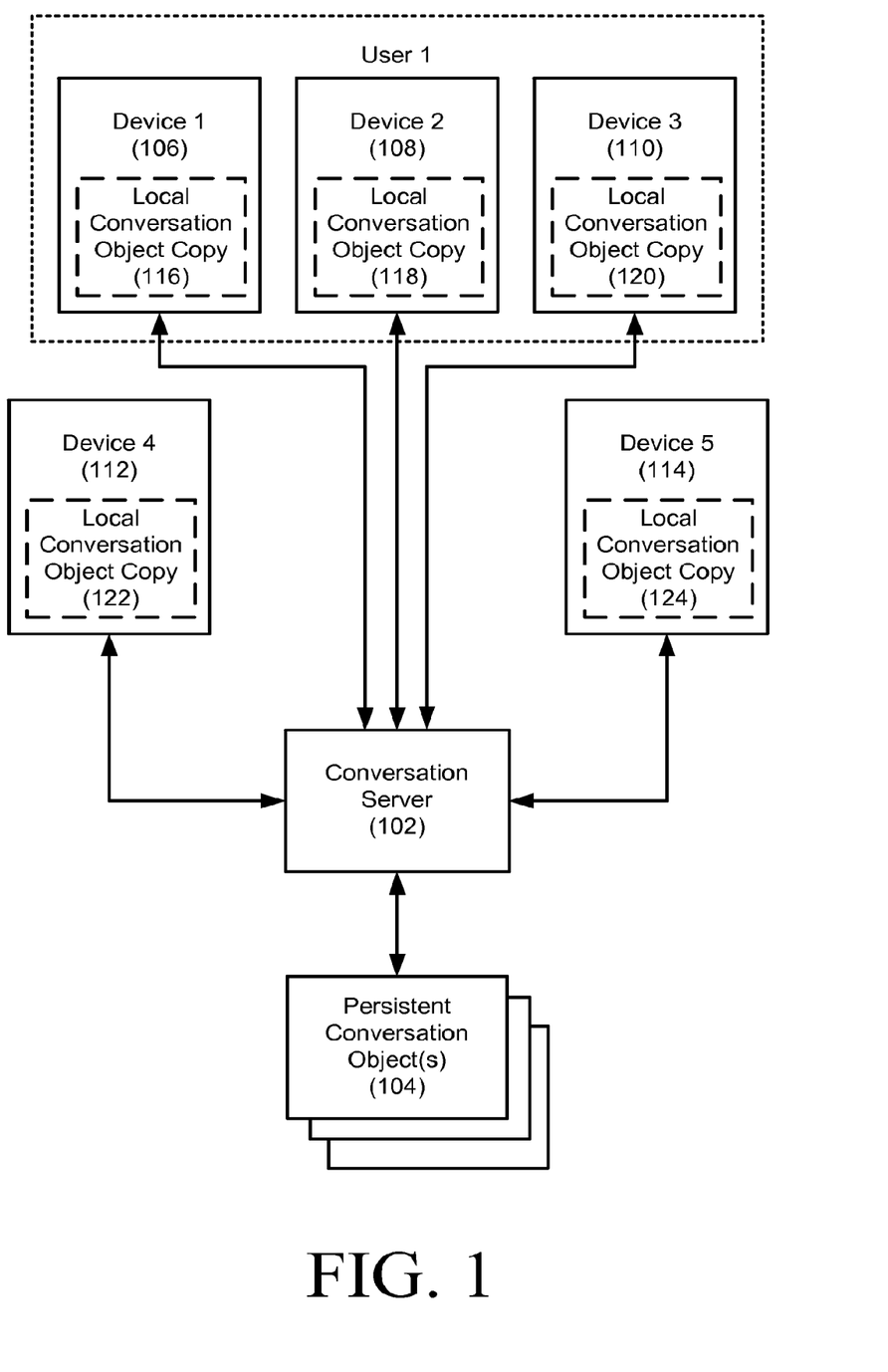
FIG. 1 is a diagram of an example persistent conversation system and user devices in accordance with some implementations.

As shown in FIG. 1, a persistent conversation environment can include a conversation server 102 and one or more persistent conversation objects 104. A plurality of devices (106-114) can be in communication with the conversation server 102. Each device (106-114) can have a local copy (116-124, respectively) of at least a portion of a persistent conversation object (104). Multiple devices can be associated with a single user. For example, Devices 1, 2 and 3 (106-110) are associated with User 1.

In operation, the conversation server 102 receives communication messages from one or more of the devices (106-114) and adds the communication message to a corresponding persistent conversation object (and can first create the persistent conversation object, if one does not exist yet for the conversation). The conversation server updates conversation state information for the persistent conversation object and then sends the communication message and updates, notifications of the newly received communication message and/or the updated conversation state information to the other devices associated with users participating in the corresponding conversation.

Each device can be executing a persistent conversation client that is kept in synchronization with the persistent conversation object(s) 104 stored and maintained by the conversation server 102. The central copy of the persistent conversation object can be a canonical copy of the conversation and/or contain the canonical state of the conversation. A local copy of at least a portion of a persistent conversation object can be cached at each device executing a conversation client associated with a participant in the conversation.

A conversation is initiated when a user starts a conversation with one or more other users. A persistent conversation can be given a name and participants can view members in the conversation and add members to the conversation. A conversation can be fully democratic (e.g., have no owner or moderator). Alternatively, a conversation could be moderated.

Conversations can be one-to-one or group conversations (e.g., at least three participants in a one-to-many or many-to-many arrangement). In any group conversation (e.g., three or more participants), a user can leave the conversation. Any user in any group conversation can add other users to the conversation. In some implementations, a conversation that originates as a one-on-one conversation cannot be converted to a group conversation. In a group conversation, users participating in the conversation can invite other users into the conversation by adding them to the conversation participants (e.g., by adding the new user(s) to the distribution list of users receiving a message in the conversation).

A user participating in a one-on-one conversation may not leave the conversation, but may delete the conversation (or one or more messages within the conversation). A user can delete individual messages from a conversation or the entire conversation. When a conversation (or message) is deleted, it may be removed from the user's device(s), but can remain stored in the persistent conversation object storage (e.g., 104).

A persistent conversation object can include conversation content and state information. The conversation state information can include a current focus state and notification state for each of the conversation participants. For example, the focus state can be one of focused, unfocused and typing. A focused state can be determined on a mobile device, for example, as the conversation client application being open and having visibility on the device display. On a desktop or laptop computer the focused state can be determined from the keyboard and/or mouse focus. In general, any indication that a conversation client application is visible or in use can be used to determine the focused state. The unfocused state can be determined as the opposite of the focused state (e.g., the conversation client application is not open (for mobile devices) or does not have keyboard or mouse focus (for desktop and laptop computers). The typing state can be determined based on the focused state coupled with an indication that the user is entering text (or otherwise entering data for the conversation such as audio, video or the like). Focus states are discussed below regarding FIGS. 3 and 7.

In addition to focus state, the conversation state information can include a watermark or level in the conversation at which each user was last focused on the conversation. This can be used to indicate or suggest a point at which each participant stopped reading the conversation. The watermark can also be used to indicate a read or unread state of the conversation. For example, if the watermark is at the lowest point in the conversation (e.g., at the most recent content addition) then the conversation can be considered to be read by the user. However, if the watermark for a user is not at the lowest point in the conversation then the conversation could be considered to be at least partially unread by that user. Watermarks for a one-on-one conversation are described below regarding FIG. 4 and FIG. 7.

The conversation state information can also include an indication of whether history tracking is enable or disabled. When history tracking is enabled, the conversation content is permanently stored in the persistent conversation object. When the history tracking is disabled (e.g., one or more users wants the conversation "off the record") the conversation will only be stored in the persistent conversation object for a finite time and then deleted. The user interface can be modified to show history tracking disabled (as discussed below regarding FIG. 6). The history enabled/disabled can be a global setting that affects all participants in the conversation.

The conversation state information can also include the name of the conversation and a list of the participants. Focus state, notification state, watermark and history tracking state information indications are applicable to both one-on-one and group conversations.

Figure 2:
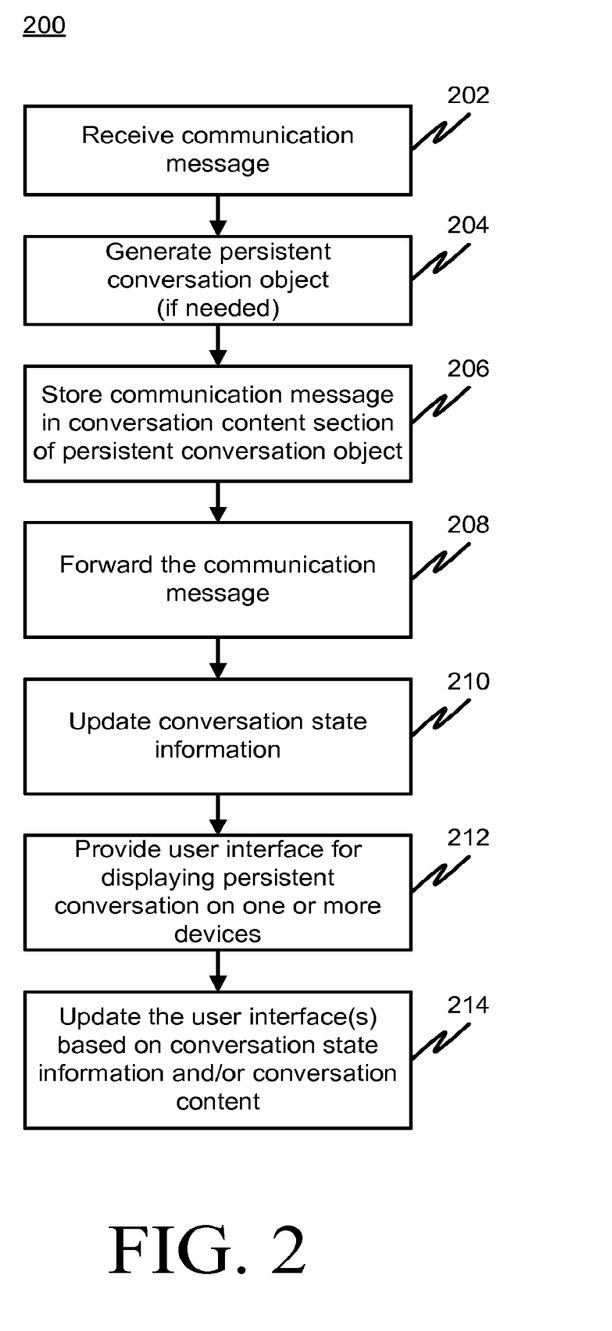
FIG. 2 is a flow chart of an example method for providing persistent conversations in accordance with some implementations.

FIG. 2 is a flow chart of an example method 200 for providing persistent conversations in accordance with some implementations. Processing begins at 202, where a communication message from one user to one or more other users is received. For example, the communication message can be received at a conversation server 102. The communication message can include one or more protocols or types, such as those mentioned above. Processing continues to 204.

At 204, a persistent conversation object is generated (or created) if one does not already exist for the conversation. Generating a persistent conversation object can include adding the communication message (or information representing or linking to the message) to the conversation content section of the conversation object. Generating can also include initializing the conversation state information to reflect the new conversation and the arrival of the communication message. The initial conversation participants can be extracted from the list of intended recipients of the communication message. The conversation can be given a default name. If a persistent conversation object already exists for the conversation, then the existing conversation object can be used. Processing continues to 206.

At 206, the communication message is stored in the conversation content section of the persistent conversation object. Processing continues to 208.

At 208, the communication message is forwarded to the other conversation participants. For example, the conversation server 102 could forward a message from Device 1 106 to the other devices (108-114). The forwarding could be accomplished by synchronizing the local copy of the conversation on each device with the canonical conversation object (e.g., 104). A conversation client on each device could be used to synchronize and update the local conversation object copy (e.g., 116-124). Processing continues to 210.

At 210 the conversation state information is updated to reflect the new communication message and the focus and notification states of the users. Processing continues to 212.

At 212, a user interface for displaying the persistent conversation on each device associated with a participant in the conversation is provided. For example, the user interface could be part of (or coupled to) the conversation client on each device (106-114). Processing continues to 214.

At 214, the user interfaces are updated base on the conversation state information and the conversation content. For example, the user interface could be updated based on synchronizing the content and state information for the conversation so that the user interface on each device shows the new communication message and also reflects real time (or near real time) conversation state information. It will be appreciated that 202-214 can be repeated in whole or in part in order to accomplish a contemplated persistent conversation task.

Figure 3:
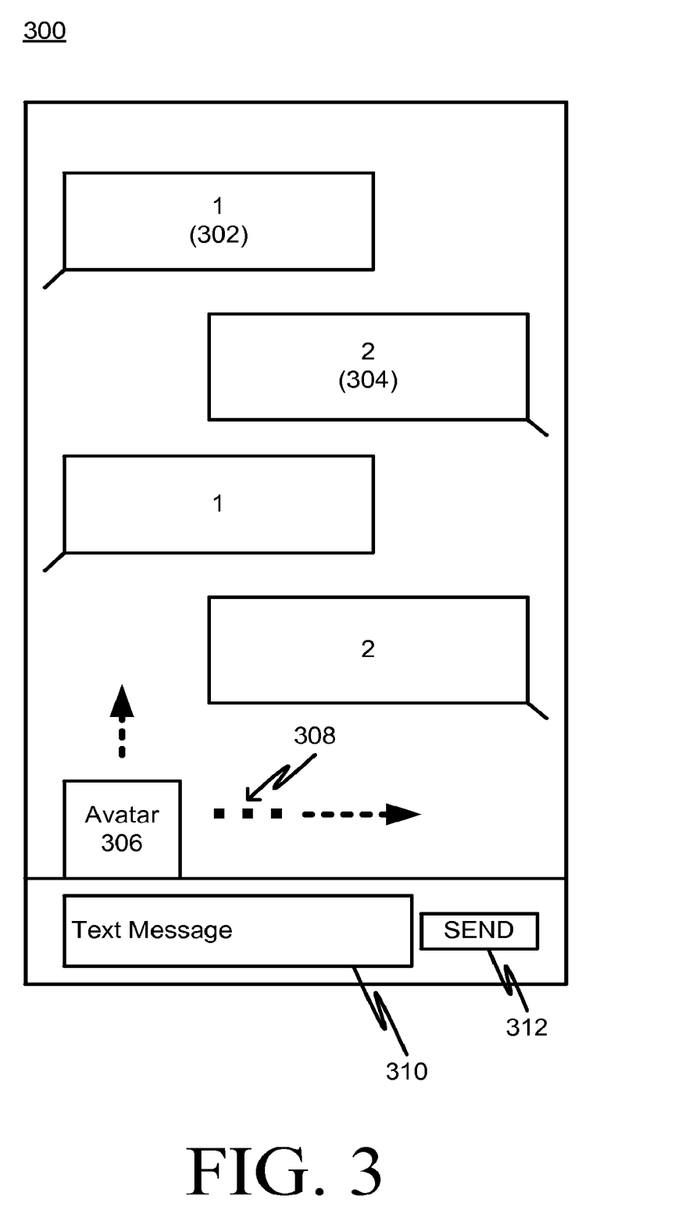
FIG. 3 is a diagram of an example persistent conversation graphical user interface in accordance with some implementations.

FIG. 3 is a diagram of an example persistent conversation graphical user interface 300 in accordance with some implementations. The user interface 300 includes communication messages from a first user (302) and a second user (304). A conversation participant can be represented by an avatar 306. When a user is in a focused or typing state, the avatar 306 can animate and rise in an upward direction as shown by the dashed arrow pointing toward the top of the figure. Also, when the user associated with the avatar 306 is typing, an indication can be made (308) that the user is typing. The indication can include animated dots as shown by the dashed arrow pointing to the right of 306 in FIG. 3.

The user interface 300 can also include a text entry element 310 and a send button 312 for sending the message typed in the text entry element 310.

Figure 4:
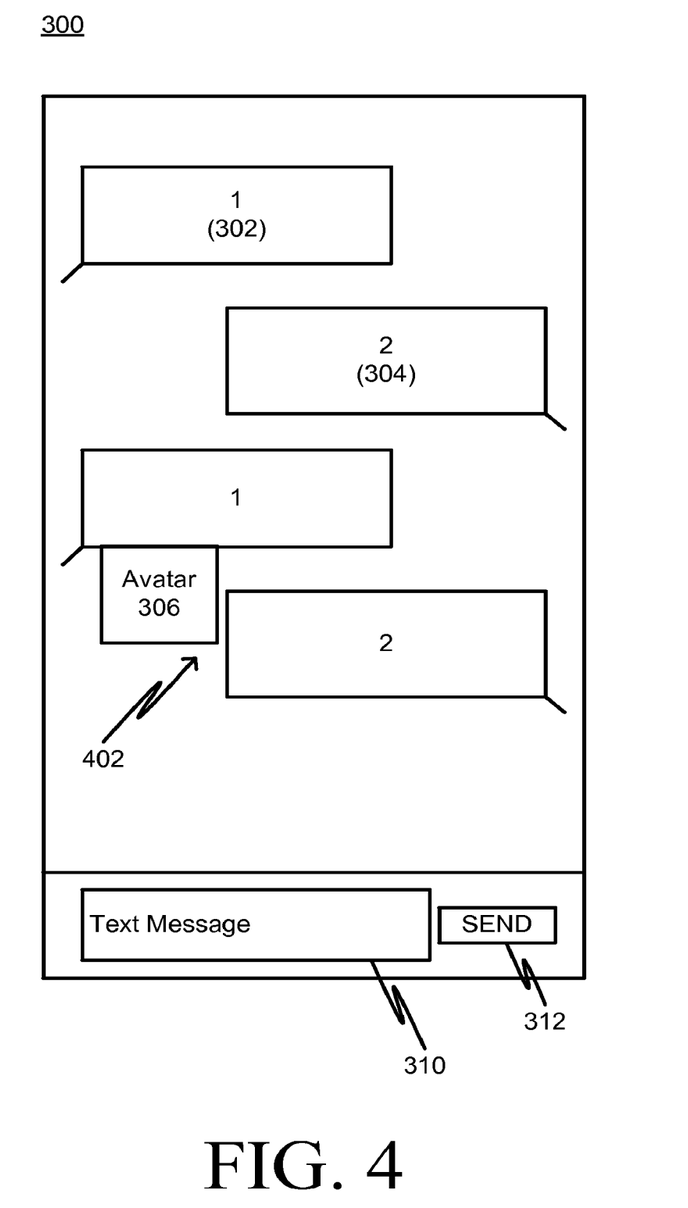
FIG. 4 is a diagram of an example persistent conversation graphical user interface in accordance with some implementations.

FIG. 4 is a diagram of an example persistent conversation graphical user interface in accordance with some implementations. In addition to the elements identified above in connection with FIG. 3, there is shown in FIG. 4 an example of a watermark in which the avatar 306 is placed at a location 402 indicating the watermark for the user associated with the avatar 306.

Figure 5:
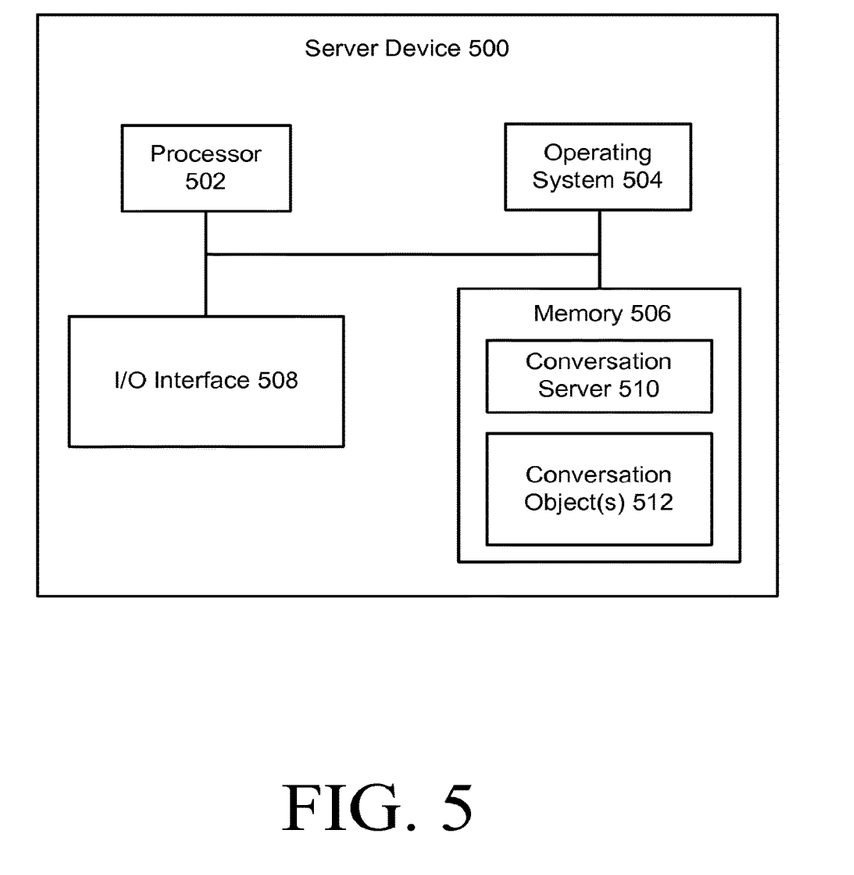
FIG. 5 is a diagram of an example server system in accordance with some implementations.

FIG. 5 is a diagram of an example server device 500 that can be used to create, manage, distribute and cause to be displayed persistent conversations in accordance with some implementations. The server device 500 includes a processor 502, operating system 504, memory 506 and I/O interface 508. The memory 506 can include a persistent conversation server 510 and one or more persistent conversation objects 512.

In operation, the processor 502 may execute the conversation server application 510 stored in the memory 506. The conversation server 510 can include software instructions that, when executed by the processor, cause the processor to perform operations for creating, managing, distributing and causing to be displayed persistent conversations in accordance with the present disclosure (e.g., the conversation server 510 can perform one or more of steps 202-214 described above and, in conjunction, can access the conversation object(s) 512). The conversation server 510 can also operate in conjunction with the operating system 504.

Persistent conversation can be used among members (or users) of a social network. For example, the messages sent between a first social network member and one or more other members in the social graph of the first social network member (or to users outside of the social network) can be exchanged via a persistent conversation as described above.

Figure 6:
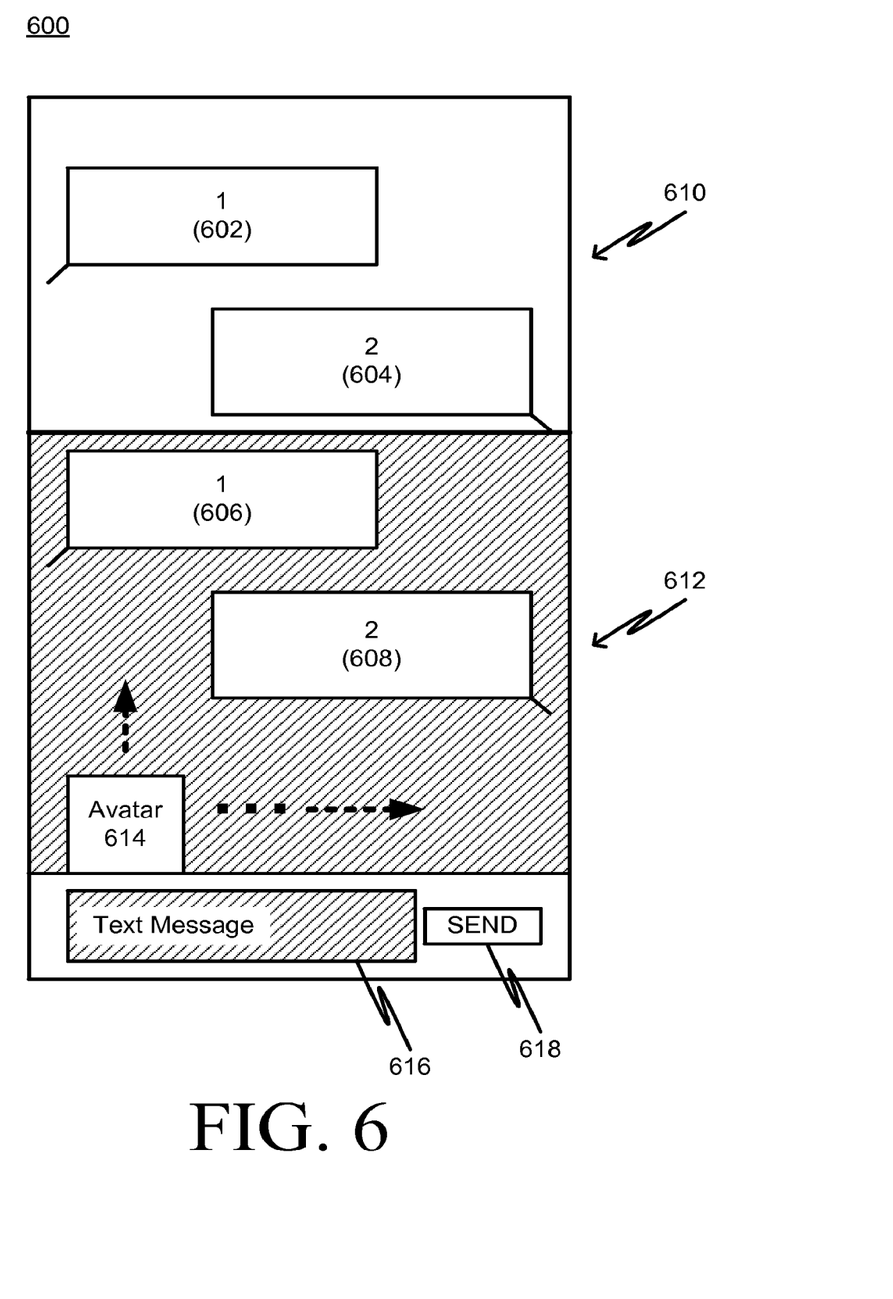
FIG. 6 is a diagram of an example persistent conversation graphical user interface in accordance with some implementations.

FIG. 6 is a diagram of an example persistent conversation graphical user interface 600 in accordance with some implementations. In particular, the user interface 600 includes messages from a first user (602) and a second user (604) in a section of the conversation in which history tracking was enabled 610. There are also messages from the first user (606) and the second user (608) in a section of the conversation in which the history has been disabled 612.

The user interface 600 includes an avatar as described above and a text message area 616 and a send button 618.

When history is disabled (e.g., the conversation is "off the record") the conversation rendering is changed for the section of the conversation which does not have history enabled (e.g., 612). Also, the compose experience can be changed (e.g., the background change in the text box 616) to indicate history is disabled.

Figure 7:
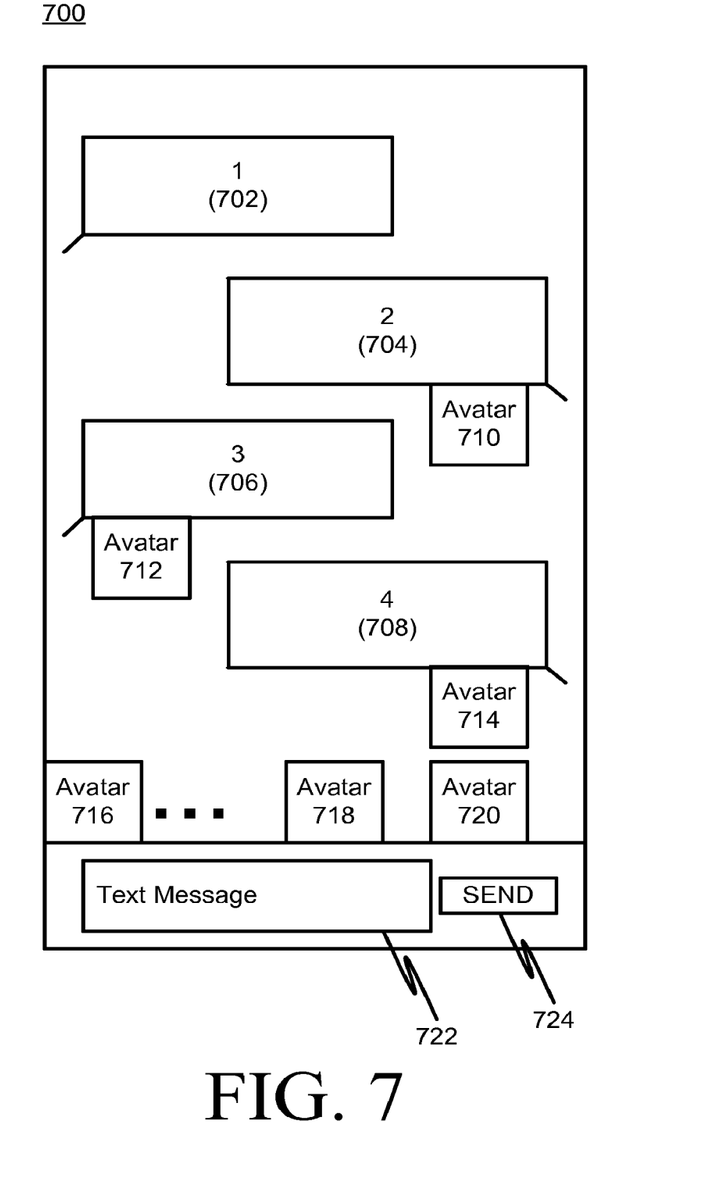
FIG. 7 is a diagram of an example persistent conversation graphical user interface in accordance with some implementations.

FIG. 7 is a diagram of an example persistent conversation graphical user interface 700 in accordance with some implementations. In particular, the user interface 700 shows a group conversation with multiple watermarks and avatars. Messages (702-708) can come from four different respective users. Each avatar (710-720) can be used to represent the watermark and/or state for each user corresponding to that avatar.

For example, the user associated with avatar 710 has a watermark at message 2 (704). The user associated with avatar 712 has a watermark at message 3 (706). The user associated with avatar 714 has a watermark at message 4 (708).

Users associated with avatars 716-720 are giving the conversation (or conversation client application) focus. The user corresponding to avatar 716 is typing.

The user interface 700 also includes a text entry element 722 and a send button 724.

Figure 8:
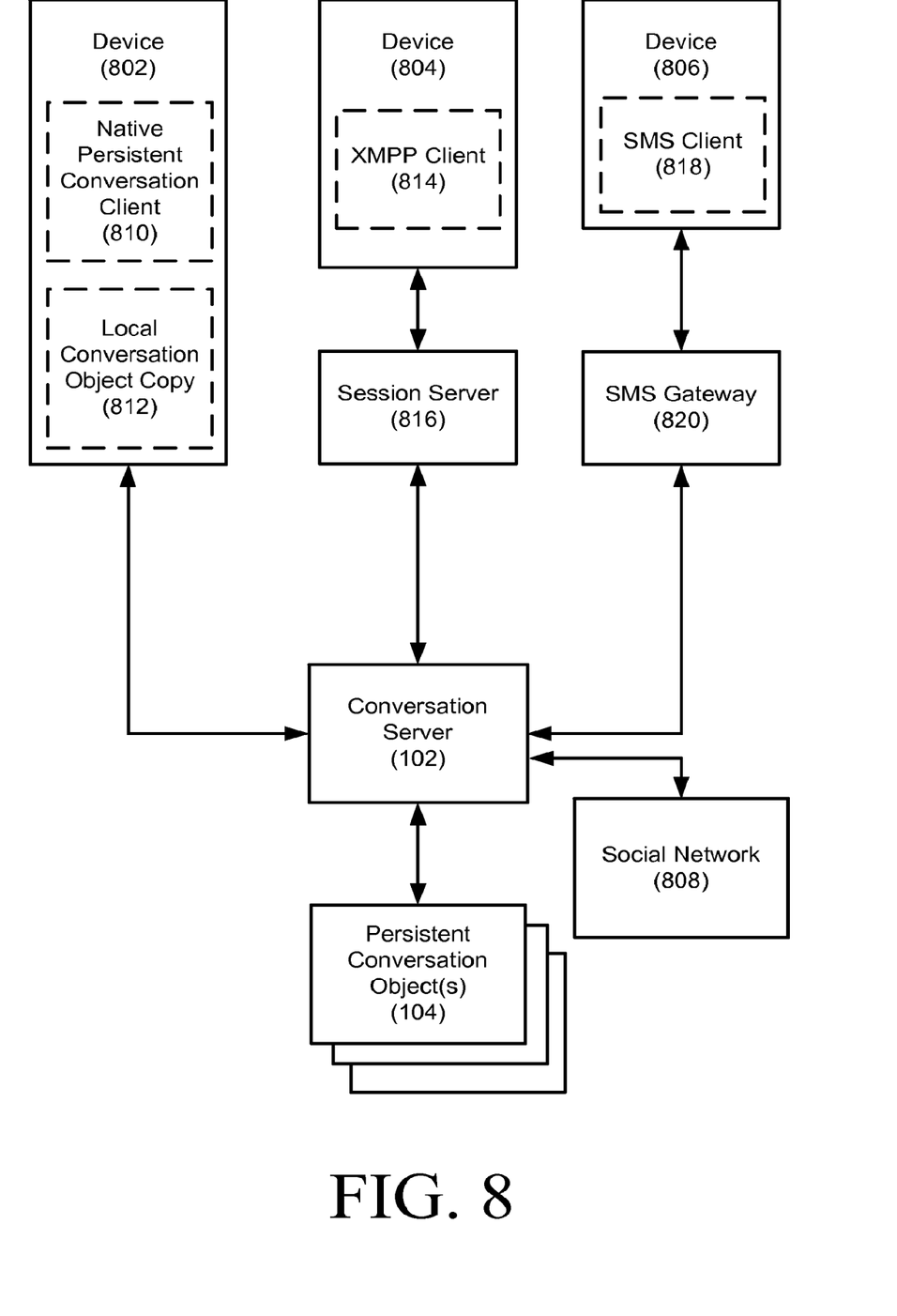
FIG. 8 is a diagram of an example persistent conversation system with integrated communication modes in accordance with some implementations.

FIG. 8 is a diagram of an example persistent conversation environment 800 with integrated communication modes in accordance with some implementations. In particular, the environment 800 includes a conversation server 102 and one or more persistent conversation objects 104. Communication messages can be exchanged between the conversation server 102 and a plurality of devices (802-806) and other systems (e.g., a social network 808). The conversation server can integrate various communications modes so that conversation participants can use a variety of corresponding devices or systems to participate in the conversation.

In operation, a device 802 can include a native persistent conversation client 810 and a local conversation object copy 812. The persistent conversation client 810 can be configured to communicate directly with the conversation server 102 without the need for an intermediate server or gateway. Communication messages from the device 802 can be received by the conversation server 102 and the conversation server can update the corresponding conversation object 104 and then synchronize the persistent conversation object 104 with the local conversation object copy 812 via the native persistent conversation client 810.

Another device 804 includes an XMPP client 814, which can communicate with the conversation server 102 via a session server 816. Yet another device 806 includes an SMS client 818 and communicates with the conversation server 102 via an SMS gateway 820. The social network 808 communicates with the conversation server 102 either directly or via an interface module (not shown).

The conversation server 102 can handle communications for a user device in any of the above mentioned protocols and any known or later developed protocols. Also, when a user changes or upgrades devices, the protocol being used by that user to participate in the conversation may change. The conversation server can recognize that the user is participating via a new or different protocol and can adapt to that change. For example, if a user has been participating in a conversation from a wireless phone via SMS text messaging, the conversation server may have established a persistent conversation object between the phone user and one or more other users. The conversation server 102 may identify the phone user via the phone number from which the user is sending messages. If the phone user upgrades to a smartphone have a more full feature set, the phone user may then participate in the conversation from the smartphone and the conversation server 102 can detect that a different device is being used by the phone user and move the phone user from being identified by a phone number to being identified by a user name or other identification (e.g., email address). As part of the transition from phone number to other identifier, the conversation server 102 may ask the phone user to verify his/her identity.

A user can participate in the conversation via social network posts or messages. For example, a social network post from a conversation participant to other participants can be included as part of the persistent conversation content. It will be appreciated that other modes of communication can be integrated such as phone calls, faxes, emails, documents, audio, video or the like.

Figure 9:
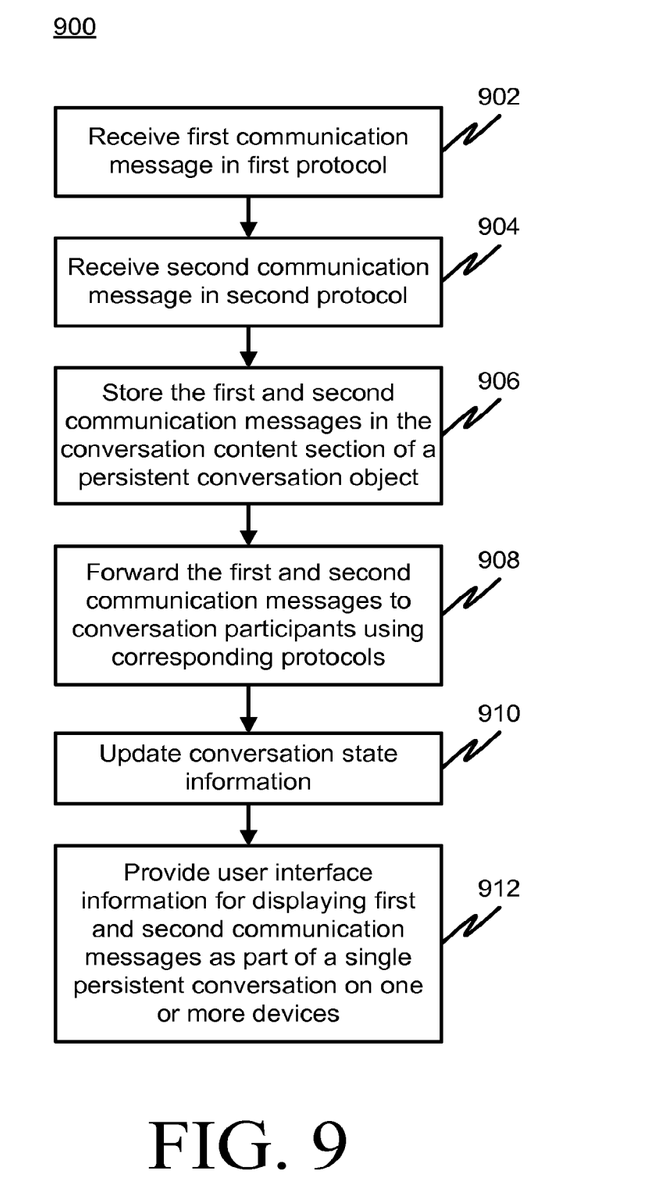
FIG. 9 is a flow chart of an example method for integrating communication modes in persistent conversations in accordance with some implementations.

FIG. 9 is a flow chart of an example method for integrating communication modes in persistent conversations in accordance with some implementations. Processing beings at 902 where a first communication message in a first protocol is received. For example, the conversation server 102 could receive a first communication message from device 802, which is communicating in a native persistent client protocol via a native persistent conversation client 810. Processing continues to 904.

At 904, a second communication message in a second protocol is received. For example, the conversation server 102 could receive a second communication message from device 804, which is communicating in an XMPP protocol. The second message being received via a session server 816. Processing continues to 906.

At 906, the first and second communication messages are stored in the content section of a persistent conversation object. For example, the conversation server 102 can store the messages in the content section of a persistent conversation object 104. If a persistent conversation object for the conversation does not yet exist when the first communication messages is received, the conversation server 102 can create a persistent conversation object 104 for the conversation. Processing continues to 908.

At 908, the first and second communication messages are forwarded to conversation participants. For example, the conversation server 102 can forward (or send) the first and second messages to each of the devices (802-806) in a corresponding protocol, e.g. native persistent conversation client protocol to device 802, XMPP to device 804 (via session server 816) and SMS to device 806 (via SMS gateway 820), and to the social network 808 in a social network message protocol. The forwarding can be accomplished as part of a synchronization between the conversation server 102 and the conversation clients in each device (810, 814 and 818), if the client has the capability to synchronize the persistent conversation. For clients without an ability to synchronize, the first and second messages can simply be sent as new messages. Processing continues to 910.

At 910, conversation state information is updated. For example, the conversation server 102 can updated the conversation state information in the persistent conversation object 104 associated with the conversation. The conversation state information, as described above, can include user focus state, watermarks, history enabled/disabled and the like. Once the state information is updated in the persistent conversation object 104, the state information can be synchronized with those devices having a client capable of synchronizing state information (e.g., device 802 with native persistent conversation client 810). Processing continues to 912.

At 912, user interface information for displaying the first and second communication messages as part of a single persistent conversation is provided. The user interface information can include data and/or code elements sent from a conversation server (e.g., 102) to one or more of the devices (802-806) associated with a user participating in the conversation. The user interface information can be used by a client program in each device to render the conversation for display on that device. The user interface information can be tailored for each device based on device type (and capabilities) and/or client type.

It will be appreciated that 902-912 can be repeated in whole or in part in order to accomplish a contemplated communication mode integration task. For example, 902-912 can be repeated for subsequent communication messages in other modes, e.g., for processing a message from device 806 in SMS protocol and integrating it into the persistent conversation.

The server (e.g., 102 and/or 500) can include, but is not limited to, a single processor system, a multi-processor system (co-located or distributed), a cloud computing system, or a combination of the above.

The client (or user, member or conversation participant) device can include, but is not limited to, a desktop computer, a laptop computer, a portable computer, a tablet computing device, a smartphone, a feature phone, a personal digital assistant, a media player, an electronic book reader, an entertainment (or computing) system of a vehicle or the like. Other examples of devices include computing and/or display systems built into windows, walls, furniture, glasses, goggles, wrist watches, clothing or the like. In general, any computing device capable of implementing one or more of the methods described herein can be used.

The user devices can be connected to a conversation server via a network. The network connecting user devices to a conversation server can be a wired or wireless network, and can include, but is not limited to, a WiFi network, a local area network, a wide area network, the Internet, or a combination of the above.

The data storage, memory and/or computer readable medium can be a magnetic storage device (hard disk drive or the like), optical storage device (CD, DVD or the like), electronic storage device (RAM, ROM, flash, or the like). The software instructions can also be contained in, and provided as, an electronic signal, for example in the form of software as a service (SaaS) delivered from a server (e.g., a distributed system and/or a cloud computing system).

Moreover, some implementations of the disclosed method, system, and computer readable media can be implemented in software (e.g., as a computer program product and/or computer readable media having stored instructions for performing one or more persistent conversation tasks as described herein). The stored software instructions can be executed on a programmed general purpose computer, a special purpose computer, a microprocessor, or the like.

It is, therefore, apparent that there is provided, in accordance with the various example implementations disclosed herein, systems, methods and computer readable media for integrating communication modes in persistent conversations.

While the disclosed subject matter has been described in conjunction with a number of implementations, it is evident that many alternatives, modifications and variations would be or are apparent to those of ordinary skill in the applicable arts. Accordingly, Applicants intend to embrace all such alternatives, modifications, equivalents and variations that are within the spirit and scope of the disclosed subject matter.

What is claimed is:

1. A computer-implemented method comprising:
   receiving, at a processor, a first communication message from a first device;
   receiving, at the processor, a second communication message from a second device, wherein the second device is different than the first device;
   storing, by the processor, the first communication message and the second communication message in a conversation content section of a persistent conversation object; and
   after the storing, forwarding, by the processor, a portion of the persistent conversation object that includes both the first communication message and the second communication message to one or more of the first device and the second device, wherein the forwarding is performed as part of synchronization between the processor and a persistent conversation client in one or more of the first device and the second device.

2. The computer-implemented method of claim 1, further comprising:
providing, for display, a user interface that shows the conversation content section including the portion of the persistent conversation object that includes both the first communication message and the second communication message.

3. The computer-implemented method of claim 1, wherein the first communication message is in a first communication protocol that includes a native persistent conversation client protocol and the second communication message is in a second communication protocol that includes an extensible messaging and presence protocol different from the first communication protocol.

4. The computer-implemented method of claim 3, further comprising:
receiving a third communication message in a third communication protocol, wherein the third communication protocol is different from the first communication protocol and the second communication protocol; and
storing the third communication message in the conversation content section of the persistent conversation object.

5. The computer-implemented method of claim 4, wherein the third communication protocol is a short message service protocol.

6. The computer-implemented method of claim 4, further comprising:
receiving a fourth communication message in a fourth communication protocol, wherein the fourth communication protocol is different from the first communication protocol, the second communication protocol and the third communication protocol; and
storing the fourth communication message to the conversation content section of the persistent conversation object.

7. The computer-implemented method of claim 6, wherein the fourth communication protocol is a social network messaging protocol.

8. The computer-implemented method of claim 4, wherein receiving the third communication message includes receiving the third communication message via a short message service gateway.

9. A system comprising:
a hardware processor coupled to a non-transitory computer readable storage medium having stored thereon instructions that, when executed by the hardware processor, cause the hardware processor to perform operations comprising:
receiving a first communication message from a first device;
receiving a second communication message from a second device, wherein the second device is different than the first device;
storing the first communication message and the second communication message in a conversation content section of a persistent conversation object; and
after the storing, forwarding a portion of the persistent conversation object that includes both the first communication message and the second communication message to one or more of the first device and the second device, wherein the forwarding is performed as part of a synchronization between the processor and a persistent conversation client in one or more of the first device and the second device.

10. The system of claim 9, wherein the operations further comprise:
providing, for display, a user interface showing the conversation content section including the portion of the persistent conversation object containing both the first communication message and the second communication message that was forwarded.

11. The system of claim 9, wherein the first communication message is in a first communication protocol that includes a native persistent conversation client protocol and the second communication message is in a second communication protocol that includes an extensible messaging and presence protocol.

12. The system of claim 11, wherein the operations further comprise:
receiving a third communication message in a third communication protocol, wherein the third communication protocol is different from both the first communication protocol and the second communication protocol; and
storing the third communication message in the conversation content section of the persistent conversation object.

13. The system of claim 12, wherein the third communication protocol is a short message service protocol.

14. The system of claim 12, wherein the operations further comprise:
receiving a fourth communication message in a fourth communication protocol, wherein the fourth communication protocol is different from each of the first communication protocol, the second communication protocol and third communication protocol; and
storing the fourth communication message to the conversation content section of the persistent conversation object.

15. The system of claim 14, wherein the fourth communication protocol is a social network messaging protocol.

16. The system of claim 12, wherein the receiving the third communication message includes receiving the third communication message via a short message service gateway.

17. A nontransitory computer readable medium having stored thereon instructions that, when executed by a processor, cause the processor to perform operations comprising:
receiving a first communication message from a first device;
receiving a second communication message from a second device, wherein the second device is different than the first device;
storing the first communication message and the second communication message in a conversation content section of a persistent conversation object; and
after the storing, forwarding a portion of the persistent conversation object that includes both the first communication message and the second communication message to one or more of the first device and the second device, wherein the forwarding is performed as part of a synchronization between the processor and a persistent conversation client in one or more of the first device and the second device.

18. The nontransitory computer readable medium of claim 17, wherein the first communication message is in a first communication protocol that includes a native persistent conversation client protocol and the second communication message is in a second communication protocol that includes an extensible messaging and presence protocol.

19. The nontransitory computer readable medium of claim 18, wherein the operations further comprise:
receiving a third communication message in a third communication protocol, wherein the third communication protocol is different from both the first communication protocol and the second communication protocol; and
storing the third communication message in the conversation content section of the persistent conversation object.

20. The nontransitory computer readable medium of claim 19, wherein the operations further comprise:
receiving a fourth communication message in a fourth communication protocol, wherein the fourth communication protocol is different from each of the first communication protocol, the second communication protocol and third communication protocol; and
storing the fourth communication message to the conversation content section of the persistent conversation object.

* * * * *